United States Patent
Lee et al.

(10) Patent No.: US 8,184,420 B2
(45) Date of Patent: May 22, 2012

(54) CONTROL MODULE AND FAULT CURRENT LIMITER WITH FUNCTION OF OPENING AND CLOSING

(75) Inventors: Gyeong Ho Lee, Cheongju-si (KR); Kwon Bae Park, Daejeon (KR); Jung Wook Sim, Cheongju-si (KR)

(73) Assignee: LS Industrial Systems Co., Ltd., Anyang-si, Gyeonggi-do (KR)

( * ) Notice: Subject to any disclaimer, the term of this patent is extended or adjusted under 35 U.S.C. 154(b) by 390 days.

(21) Appl. No.: 12/634,643

(22) Filed: Dec. 9, 2009

(65) Prior Publication Data

US 2010/0165533 A1    Jul. 1, 2010

(30) Foreign Application Priority Data

Dec. 31, 2008    (KR) .................. 10-2008-0138844

(51) Int. Cl.
*H02H 9/08* (2006.01)
*H02H 3/08* (2006.01)
*H02H 9/02* (2006.01)

(52) U.S. Cl. ...................... 361/93.9; 361/93.1
(58) Field of Classification Search ................. 361/93.1, 361/93.9, 102

See application file for complete search history.

(56) References Cited

U.S. PATENT DOCUMENTS

| | | | | | |
|---|---|---|---|---|---|
| 5,745,322 | A | * | 4/1998 | Duffy et al. | 361/45 |
| 5,815,387 | A | * | 9/1998 | Aritsuka | 363/54 |
| 6,104,583 | A | * | 8/2000 | Wynn et al. | 361/7 |
| 6,768,621 | B2 | * | 7/2004 | Arnet et al. | 361/93.1 |
| 7,035,071 | B1 | * | 4/2006 | Tiew et al. | 361/93.9 |
| 7,742,264 | B2 | * | 6/2010 | Hyun et al. | 361/19 |

FOREIGN PATENT DOCUMENTS

| | | |
|---|---|---|
| JP | 2005-50737 | 2/2005 |
| KR | 1995-0008083 | 9/1995 |
| KR | 10-0802312 | 2/2008 |

* cited by examiner

*Primary Examiner* — Dharti Patel
(74) *Attorney, Agent, or Firm* — Lee, Hong, Degerman, Kang & Waimey (57) ABSTRACT

The present disclosure relates to a fault current limiter, comprising: a trigger device dividing a fault current to a path on which a normal current flows and to a path on which the fault current flows when the fault current is generated; a first switch connected in series to a rear end of the trigger device; a fixation unit for fixing an open/close state of the first switch; a driver for opening a contact point contacted by the first switch by repulsive force generated by the fault current in a case the fault current divided by the trigger device is inputted; and a control module for driving the fixation unit in order to fix the open/close state of the first switch in a case the fault current is generated.

20 Claims, 9 Drawing Sheets

CONTROL MODULE AND FAULT CURRENT LIMITER WITH FUNCTION OF OPENING AND CLOSING

CROSS-REFERENCE TO RELATED APPLICATION

The present application is based on, and claims priority from, Korean Application Numbers 10-2008-0138844, filed Dec. 31, 2008, the disclosure of which is incorporated by reference herein in its entirety.

FIELD OF THE DISCLOSURE

The present disclosure relates to a control module and a fault current limiter with function of opening and closing, the control module capable of controlling the fault current limiter for a normal operation in a case the fault current limiter erroneously operates due to various reasons.

DISCUSSION OF THE RELATED ART

An electric power system is generally mounted with a current limiter for limiting a fault current more than a threshold value in order to protect against burnt-out and damage by the fault current caused by accidents such as thunder-stroke, earth fault and short-circuit, and a circuit breaker for preventing the fault current from load.

The current limiter serves to limit a fault current more than a threshold value to reduce mechanical, thermal and electrical stresses caused by electric power appliances such as, for example, bus bars, insulators and circuit breakers, to a minimum and to protect the electric appliances against the fault current.

On the other hand, a circuit breaker connected to an electric power system detects an over-current more than a threshold value, breaks the connection with the electric power system in accordance with control of an over-current relay generating a breaking signal and thus prevents the over-current from flowing into the electric power system.

Meanwhile, 3 to 5 periods of the fault current are required in a circuit breaker for breaking an over-current more than a threshold value in response to control of an over-current relay, which is due to the fact that a considerable time is required for the over-current relay to detect a fault current exceeding a threshold value.

However, the conventional current limiter has disadvantages in that a sufficient repulsive force cannot be generated to stop operating due to a limited amount of fault current, or the fault current cannot be properly limited to cause damages to the electrical equipment.

SUMMARY OF THE DISCLOSURE

In one general aspect of the present disclosure, there is provided a fault current limiter comprising: a trigger device dividing a fault current to a path on which a normal current flows and to a path on which the fault current flows when the fault current is generated; a first switch connected in series to a rear end of the trigger device; a fixation unit for fixing an open/close state of the first switch; a driver for opening a contact point contacted by the first switch by repulsive force generated by the fault current in a case the fault current divided by the trigger device is inputted; and a control module for driving the fixation unit in order to fix the open/close state of the first switch in a case the fault current is generated.

In some exemplary embodiment of the present disclosure, the control module may supply a driving power to the fixation unit for closing the contact point of the first switch in a case the fault current disappears, and drive the fixation unit in order to fix the closed state of the first switch.

In another general aspect of the present disclosure, there is provided a control module disposed with an open/close function for controlling a device capable of performing an opened/closed path operation of a switch, the control module comprising: a capacitor for charging or discharging a current capable of driving the device; a protection relay for outputting information signal for determining whether the fault current has been generated and including information of a result of determining whether the current is a fault current or a normal current; and a controller for changing a path of the current discharged by the capacitor in response to the information signal in a case the information signal is inputted from the protective relay.

DETAILED DESCRIPTION

Figure 1:
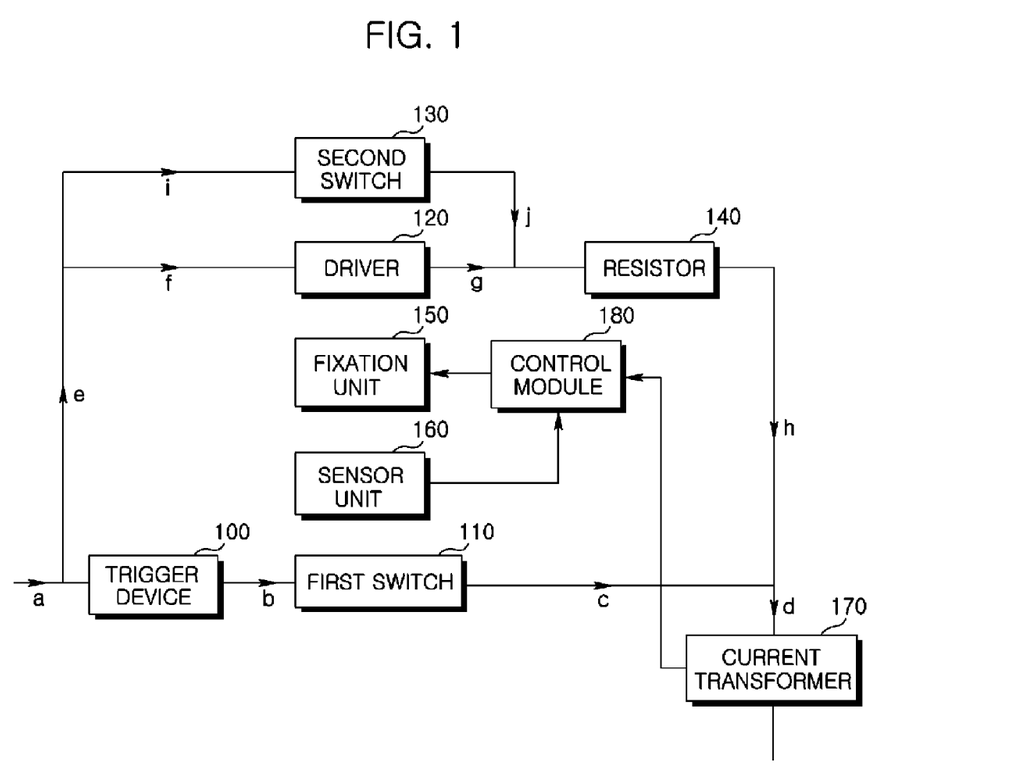
FIG. 1 is a schematic diagram illustrating an exemplary embodiment of a fault current limiter according to the present disclosure.

FIG. 1 is a schematic diagram illustrating an exemplary embodiment of a fault current limiter according to the present disclosure.

Referring to FIG. 1, the fault current limiter may include a trigger device 100, a first switch 110, a driver 120, a second switch 130, a resistor 140, a fixation unit 150, a sensor unit 160, a current transformer 170 and a control module 180.

The trigger device 100 maintains a low impedance state in a case a normal current flows and directs the normal current to a b path. That is, the normal current flows on a b path, a c path and a d path. The trigger device 100 therefore can pass the current without any loss of normal current. Meanwhile, in a case there is generated a current more than a threshold value, the trigger device 100 is changed to a high impedance state to direct the fault current to an e path.

That is, the trigger device 100 is changed to a high impedance state while conducting a current in a low impedance state in a case a normal current flows, but is changed to a high impedance state in a case a fault current flows to direct the fault current to an e path.

The fault current directed to the e path comes to flow through an f path, a g path, an h path and a d path. The fault current comes to flow on an i path through the e path when contacted by a contact point of the second switch 130. That is, the fault current directed to the e path comes to flow through the i path, a j path, the h path and the d path. The 'normal current' defines a current that flows in a normal state. The normal state defines a state where there is generated no earth fault, short-circuit and the like. The 'fault current' defines a sudden large current that is caused by the earth fault, short-circuit and the like.

The trigger device 100 may correspond to superconductor, a positive temperature coefficient (PTE) or a liquid metal, and is preferably configured to have a high impedance within a ¼ period in a case a fault current higher than a threshold value flows.

The first switch 110 is connected in series to a rear end of the trigger device 100. The first switch 110 conducts a normal current flowing on the b path in a state of the contact point being contacted in ordinary times. However, in a case there is generated a fault current, the contact points of the first switch 110 are detached by a repulsive force generated by the fault current. The process of the contact points being separated will be described in detail with reference to FIG. 2.

The driver 120 is connected to an f path connected in parallel with the trigger device 100 and the first switch 110. In a case the fault current flows through the f path, the driver 120 separates the contact points of the first switch 110 using a repulsive force generated by the fault current. The repulsive force is generated in a case a fault current higher than a threshold value directed by the trigger device 100 flows. The process of the contact points being detached will be described in detail reference to FIG. 2.

The second switch 130 is connected to the driver 120 in parallel. The second switch 130 is being detached in ordinary times. However, in a case the fault current flows in the f path, the driver 120 uses the repulsive force generated by the fault current to bring the contact points of the second switch 130 into contact. Therefore, the fault current flows through the i path in a case the contact points of the second switch 130 are contacted while flowing on the f path. As a result, the second switch 130 prevents the fault current from introducing into the driver 120 only, whereby the driver 120 is saved from thermal and mechanical damages. That is, the second switch 130 prevents the fault current from flowing in the driver 120 at all times and the driver 120 from being applied with an excessive repulsive force to guard the driver 120 against the damages. The process of the contact points being detached will be described in detail reference to FIG. 2.

The timing of the contact points of the first switch 110 being detached and the timing of the contact points of the second switch 130 being contacted may occur almost at the same time, or the latter may occur after the former.

The resistor 140 is connected in series to the driver 120 and the rear end of the second switch 130. The resistor 140 may limit the fault current flowing through the driver 120 or the second switch 130 to below a predetermined level. As a result, power equipment connected to the rear end of the second switch 130 may be prevented from being applied with a large-valued fault current.

A variety of equipment may be used for the fixation unit 150, but the present exemplary embodiment will be described based on a permanent magnet actuator.

The permanent magnet actuator 150 applies a force to the first switch 110 and the second switch 130 to allow maintaining the current state of the contact points of the switches 110, 130. For example, in case a normal current flows, the permanent magnet actuator 150 applies the force in such a manner that the contact points of the first switch 110 are continuously separated while the contact points of the second switch 130 are continuously contacted. The permanent magnet actuator 150 may change the open/close state of the first switch 110 (to be described later).

The sensor unit 160 may determine whether the first switch 110, the driver 120 and the second switch 130 are operative, and determine whether a current flowing in the current system is a fault current or a normal current.

For example, the contact points of the first switch 110 are closed (contacted) in case the normal current flows in the first switch 110, but the contact points of the first switch 110 are opened (detached) in case the fault current flows. Therefore, the sensor unit 160 determines the positions of the contact points of the first switch 110 to determine whether the current is a fault current or a normal current.

Furthermore, the fault current or the normal current may also be determined by using position of the contact points of the second switch 130 or position changes of a first coil 121 of the driver 120 and a repulsive plate 122 (described later).

The sensor unit 160 may transmit the determination result of whether the current is a fault current or a normal current to the control module 180. The sensor unit 160 may transmit to the control module 180 all the determination results of the fault current or the normal current, or may transmit to the control module 180 only the determination result of the fault current.

The sensor unit 160 may include a sensor and a sensor controller. The sensor unit 160 may be also comprised of a limit switch, a proximity sensor and the like. The position of the sensor unit 160 is not limited to a position in what is shown in FIG. 1, but may include various changed positions.

The current transformer (CT. 170) is connected in series to the first switch 110 and the rear end of the driver 120, and may reduce an inputted large current using a predetermined ratio and output the reduced current to the control module 180.

The control module 180 determines whether a current flowing in the current system is a fault current or a normal current by using information of whether the fault current determined by the sensor unit 160 has occurred and/or the reduced current value inputted into the current transformer 170. The control module 180 measures the reduced current value inputted from the current transformer 170, and measures a current value flowing in the current system by compensating the reduced current value as much as the ratio used by the current transformer 170.

A current in the current transformer 170 is determined as a fault current if the current is larger than a predetermined current value, and is determined as a normal current if the current is lower than the predetermined current value. For instance, if the reduced current inputted from the current transformer 170 is 2 A, and if a ratio used by the current transformer 170 is 100:1, the control module 180 determines the current value flowing in the current system as 200 A.

If the predetermined current value is 160 A, the control module 180 determines the current value as a fault current because the current value flowing in the current system is larger than the predetermined current value.

Meanwhile, if the current value inputted from the current transformer 170 is 1.5 A, the control module 180 determines the current value flowing in the current system is 150 A, and determines it as the normal current because the current value flowing in the current system is smaller than the predetermined current value. As a result of the determination result, the control module 180 supplies a driving power to the permanent magnet actuator 150. The permanent magnet actuator 150 performs an operation of opening/closing the first switch 110 in response to the driving power. Following the operation, the actuator 150 fixes the opened or closed state of the first switch 110.

Figure 2:
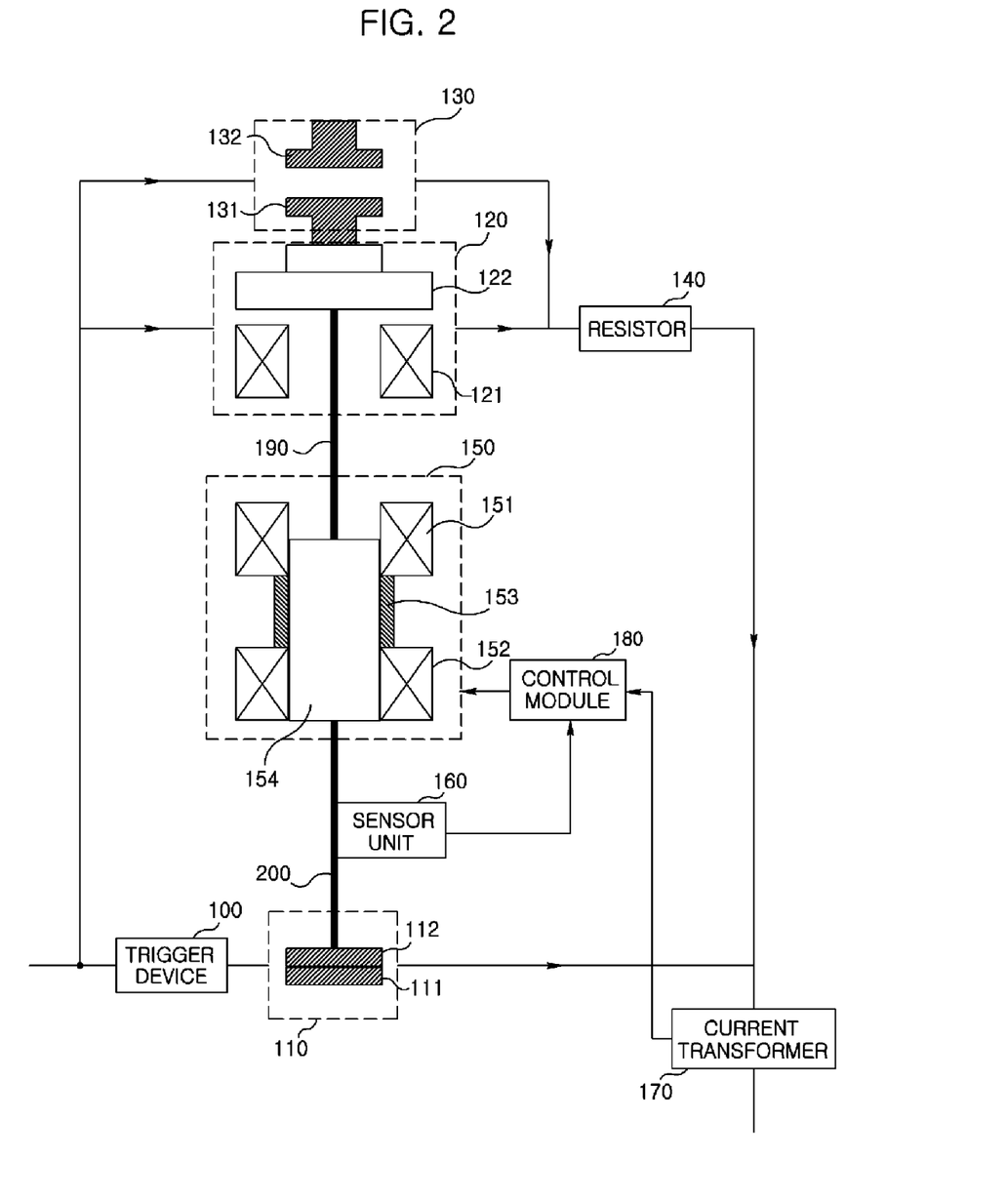
FIG. 2 is a schematic diagram illustrating a mechanical configuration of the fault current limiter of FIG. 1.

FIG. 2 is a schematic diagram illustrating a mechanical configuration of the fault current limiter of FIG. 1.

Referring to FIG. 2, the fault current limiter may include a trigger device 100, a first switch 110, a driver 120, a second switch 130, a resistor 140, a permanent magnet actuator 150, a sensor unit 160, a current transformer 170, a control module 180, a first connection axle 190 and a second connection axle 200.

The description of the trigger device 100, the resistor 140, the sensor unit 160, the current transformer 170 and the control module 180 will be omitted as is the same as in FIG. 1.

The first switch 110 may include a first contact point 111 and a second contact point 112, The contact points (111, 112) are closed if a normal current flows but are opened if the fault current flows.

The driver 120 may include a first coil and a repulsive plate 122. The repulsive plate 122 is preferred to be used with a conductor having a low resistivity such as copper or aluminum. If a normal current flows, the first coil 121 and the repulsive plate 122 are almost in touch with each other but if a fault current is generated in the current system, the fault current flows in the first coil 121 and an electronic repulsive force is generated by the fault current. The repulsive plate 122 is moved upward by the electronic repulsive force.

The second switch 130 may include a third contact point 131 and a fourth contact point 132. The contact points (131, 132) are opened if a normal current flows in the current system but are closed if a fault current is generated. The third contact point 131 is coupled directly or via a connection axle to the repulsive plate 122.

The permanent magnet actuator 150 may include a second coil 151, a third coil 152, a permanent magnet 153 and a plunger 154. The second coil 151 is disposed at an upper side of the permanent magnet actuator 150. The third coil 152 is formed at a lower side of the permanent magnet actuator 150. The permanent magnet 153 is interposed between the first coil 151 and the second coil 152. The plunger 154 moves up and down inside the first coil 151 and the second coil 152. The permanent magnet actuator 150 may be embodied by an electron-magnetic force driving actuator (EMFA).

One end of the first connection axle 190 is connected to a lower side of the repulsive plate 122 while the other end of the first connection axle 190 is connected to an upper side of the plunger 154 to move up and down. Preferably, the first connection axle 190 is positioned at the center of the repulsive plate 122 or at the center of the plunger 154. The position of the first connection axle 190 is not particularly restricted but may be variably connected to other areas.

One end of the second connection axle 200 is connected to the second contact point 112 of the first switch 110 while the other end is connected to a lower side of the plunger 154 to move horizontally thereat. The second connection axle 200 is preferably positioned at the center of the plunger 154 or the second contact point 112. The position of the second connection axle 200 is not particularly restricted but may be variably connected to other areas.

The first connection axle 190 and the second connection axle 200 may be configured in a single connection axle. For example, one end of the connection axle may communicate with the plunger 154 to be connected to the lower side of the repulsive plate 122, while the other end may be connected to the first contact point 112 of the first switch 110 to move horizontally thereat.

Therefore, the first switch 110, the driver 120, the second switch 130 and the permanent magnet actuator 150 are all connected. That is, if the connection axles (190, 200) move, all the above-mentioned constituent elements move altogether at the same time.

The positions of the first switch 110, the fixation unit 150, the driver 120 and the second switch 130 are not restricted to those shown in FIG. 2, but may be variably changed as long as the same functions are maintained. For example, even if the driver 120 is interposed between the fixation unit 150 and the first switch 110, the same function as that of FIG. 2 can be performed. Other variable positions may be recommendable.

Now, detailed description of how the above-mentioned constituent elements are driven if a normal current and a fault current flow will be given with reference to FIGS. 4a to 6b.

Figure 3:
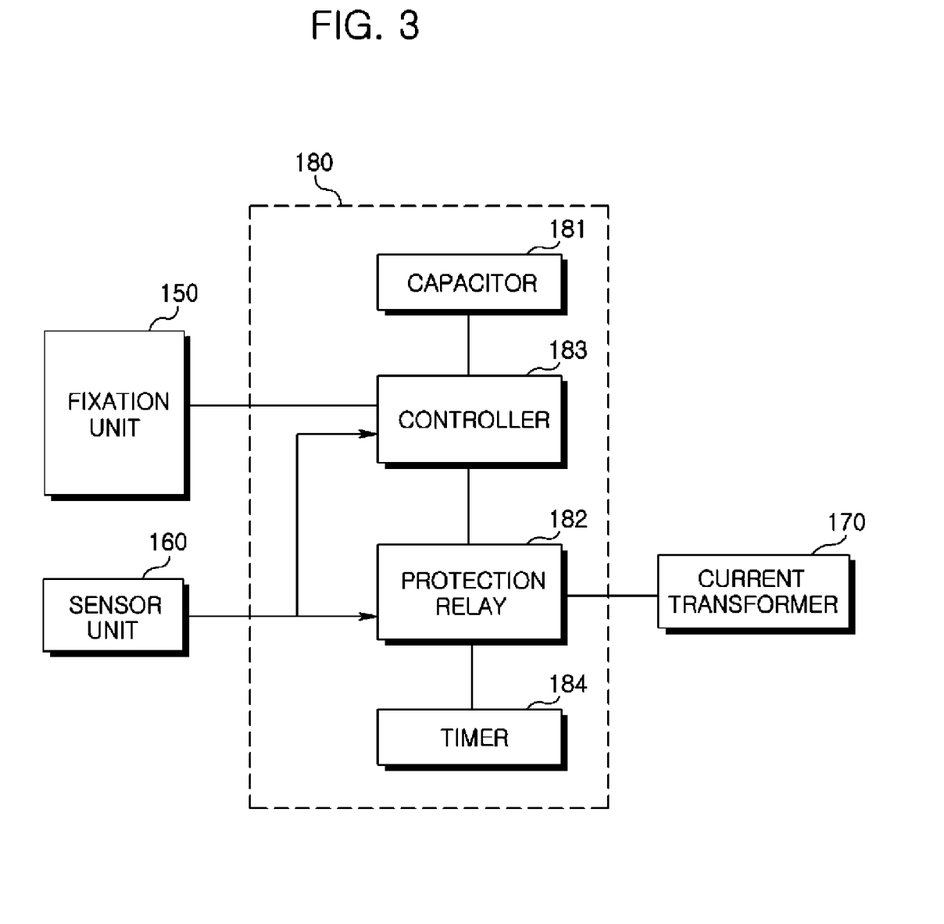
FIG. 3 is a detailed diagram illustrating configuration of a control module of FIG. 2.

FIG. 3 is a detailed diagram illustrating configuration of a control module of FIG. 2.

Referring to FIGS. 2 and 3, the control module 180 may include a capacitor 181, a protection relay 182, a controller 183 and a timer 184.

The protection relay 182 determines whether there is generated a normal current or a fault current using information from the sensor unit 160 of determining whether the contact points of the first switch 110 are contacted and/or a current value transmitted from the current transformer 170. The control module 180 measures the reduced current value inputted from the current transformer 170, and compensates the reduced current value as much as the predetermined ratio used by the current transformer 170 to measure the current value flowing in the current system.

A current in the current transformer 170 is determined as a fault current if the current is larger than a predetermined current value, and is determined as a normal current if the current is lower than the predetermined current value. As a result of the determination result, the protection relay 182 transmits to the controller 183 information signal including the determination result of whether there is generated a fault current or a normal current. For instance, if the determination result shows a normal current, the protection relay 182 transmits to the controller 183 the information signal including information defining that a normal current is generated. However, if the determination result reveals a fault current, the protection relay 182 transmits to the controller 183 the information signal including information defining that a fault current is generated.

If it is determined that a normal current is generated using the current value transmitted from the current transformer 170, the protection relay 182 may be controlled so that the determination can be re-performed following a predetermined time (within 3 seconds) set up by a user using the timer 184. If the protection relay 182 determines that a normal current is generated using the current value transmitted from the current transformer 170, the timer 184 controls to stop the determination operation by the protection relay 182 for a predetermined time set up by the user.

Following the lapse of the predetermined time set up by the user, the protection relay 182 determines whether there is generated a normal current or a fault current, and if it is determined that a normal current is generated, the protection relay 182 transmits to the controller 183 the information signal including information defining that there is generated a normal current.

The above-mentioned operation prevents the fault current limiter from changing too fast from an operation of limiting the fault current to an operation of allowing the normal current to flow. At the same time, the protection relay 182 is allowed to determine again whether there is generated a normal current to thereby obviate determination errors.

If the protection relay 182 determines the fault current as the normal current due to the determination error, and the current limiter performs an operation of allowing flowing the normal current, the fault current is made to flow in the system to cause a fatal damage to the power equipment. Therefore, the determination of whether there is generated a fault current or a normal current should be carefully performed.

Furthermore, the protection relay 182 may determine whether there is generated a fault current or a normal current, using the current value transmitted from the current transformer 170, or using the information transmitted from the sensor unit 160 whether the contact points of the first switch 110 are closed, or using the both methods.

For instance, the protection relay 182 uses the current value transmitted from the current transformer 170 to determine that the normal current is generated, and transmits to the controller 183 the information signal including the information from the sensor unit 160 defining that the normal current is generated only if the contact points of the first switch 110 are opened (only if the fault current is generated).

The protection relay 182 needs no necessity of transmitting to the controller 183 the information meaning that the normal current is generated because no close operation is necessary in a case the contact points of the first switch 110 are closed (in a case the normal current is generated). Aside the above-mentioned exemplary embodiments, there are various methods of determining whether there is generated a normal current or a fault current, using, by the protection relay 183, both two information inputted from the current transformer 170 and the sensor unit 160.

The sensor unit 160 may determine whether there is generated a normal current or a fault current in the current system, by determining whether the first switch 110, the driver 120, the second switch 130 and the permanent magnet actuator 150 are operative.

There is a determination method that was not mentioned in FIG. 1. Because the first switch 110, the driver 120, the second switch 130 and the permanent magnet actuator 150 are connected via a single axle, the movement of the axle can tell whether there is generated a normal current or a fault current in the current system.

That is, if there is generated a fault current in the current system, the repulsive plate 122 of the driver 120 is moved upward. The movement upward of the repulsive plate 122 renders the second contact point 112 of the first switch 110, the first contact point 131 of the second switch 130 and the plunger 154 of the permanent magnet actuator 150 to move upward altogether at the same time. As a result, the sensor unit 160 may sense the movement of the connection axle to determine whether there is generated a normal current or a fault current. For instance, if the sensor unit 160 determines the position of the connection axle as reference in a case a normal current flows in the current system, the sensor unit 160 determines that there is generated a fault current if the connection axle has moved upward, and determines that there is generated a normal current if the connection axle has not moved.

If it is determined that there is generated a fault current, the sensor unit 160 transmits the determination result to the controller 183. Furthermore, if it is determined by the sensor unit 160 that the fault current has been generated and the determination result is transmitted to the protection relay 182, the protection relay 182 may transmit the determination result to the controller 183. The method of the sensor unit 160 transmitting the determination result directly to the controller 183 is more effective out of various transmitting methods of determination result.

Because it is proper to swiftly and controllably operate the current limiter if the fault current is generated, such that transmission of the determination result of the sensor unit 160 to the controller 183 without going though the protection relay 182 can shorten the control time.

The capacitor 181 is connected to the controller 183 to charge the current, and the charged current is used for driving the permanent magnet actuator 150.

The controller 183 may control (i.e., driving power) the path of the current discharged from the capacitor 181 in response to the signal transmitted from the protection relay 182 and the sensor unit 160 to thereby control the driving of the permanent magnet actuator 150. The controller 183 preferably includes a switching function capable of changing the path of the current discharged from the capacitor 181.

For instance, the controller 183 controls (i.e., driving power) in such a manner that the current discharged from the capacitor 181 may flow to the second coil 151 of the permanent magnet actuator 150 if a signal is inputted from the sensor unit 160 that a fault current has been generated.

The plunger 154 is moved upward by the magnetic force generated when a current flows in the second coil 151. At this time, it is preferable that the right side of the second coil 151 is a direction where the current flows in and the left side of the second coil 151 is a direction where the current flows out. Therefore, the contact points of the first switch 110 are opened and the repulsive plate 122 of the driver 120 is moved upward and the contact points of the second switch 130 are closed, whereby the fault current can be further securely limited.

The controller 183, if a signal including the determination result is inputted from the protection relay 182, controls (i.e., driving power) the path of the current discharged from the capacitor 181 in response to the signal. For instance, the controller 183 controls in such a fashion that the current discharged from the capacitor 181 flows to the second coil 151 of the permanent magnet actuator 150 if an open operation control signal is inputted from the protection relay 182.

The plunger 154 is moved upwards by the magnetic force generated when the current flows in the second coil 151. As a result, the contact points of the first switch 110 are opened, the repulsive plate 122 of the driver 120 is moved upwards and the contact points of the second switch 130 are closed. Thereafter, the permanent magnet actuator 150 fixes the opened state of the first switch 110, whereby the current limiter can further securely limit the fault current.

Meanwhile, if the information signal including the information meaning that the normal current is generated is inputted from the protection relay 182, the controller 183 controls (i.e., driving power) in such a fashion that the current discharged from the capacitor 181 flows to the third coil 152 of the permanent magnet actuator 150. The timing of determining that the normal current is generated is preferably after the generation of the fault current.

The plunger 154 is moved downward by the magnetic force that is generated when the current flows in the third coil 152. As a result, the contact points of the first switch are closed to move the repulsive plate 122 of the driver 120 downwards and to open the contact points of the second switch 130.

Thereafter, the permanent magnet actuator 150 fixes the closeness of the first switch 110. At this time, it is preferable that the right side of the third coil 152 is a direction where the current flows out and the left side of the third coil 152 is a direction where the current flows in, whereby the current limiter can swiftly and accurately change from an operation of limiting the fault current to an operation of allowing the normal current to flow following the disappearance of the fault current.

As noted above, there are cases where the current limiter stops operating due to insufficient repulsive force generated due to insufficient fault current volume, and the contact points of the first switch are brought into contact again due to magnetic force of the permanent magnet actuator or vacuuming force of the first switch, even though the contact points of the first switch should be opened.

The control module and a fault current limiter with function of opening and closing according to the present disclosure are capable of determining whether there is generated a fault current or a normal current in the current system, and forcibly controlling the open/close operation of the permanent magnet actuator, whereby the fault current limiter can be further accurately operated.

In the present exemplary embodiment, the protection relay 182 and the controller 183 are separately described, it should be apparent that the protection relay 182 and the controller 183 may be configured in a single device or a single chip.

Figure 4A:
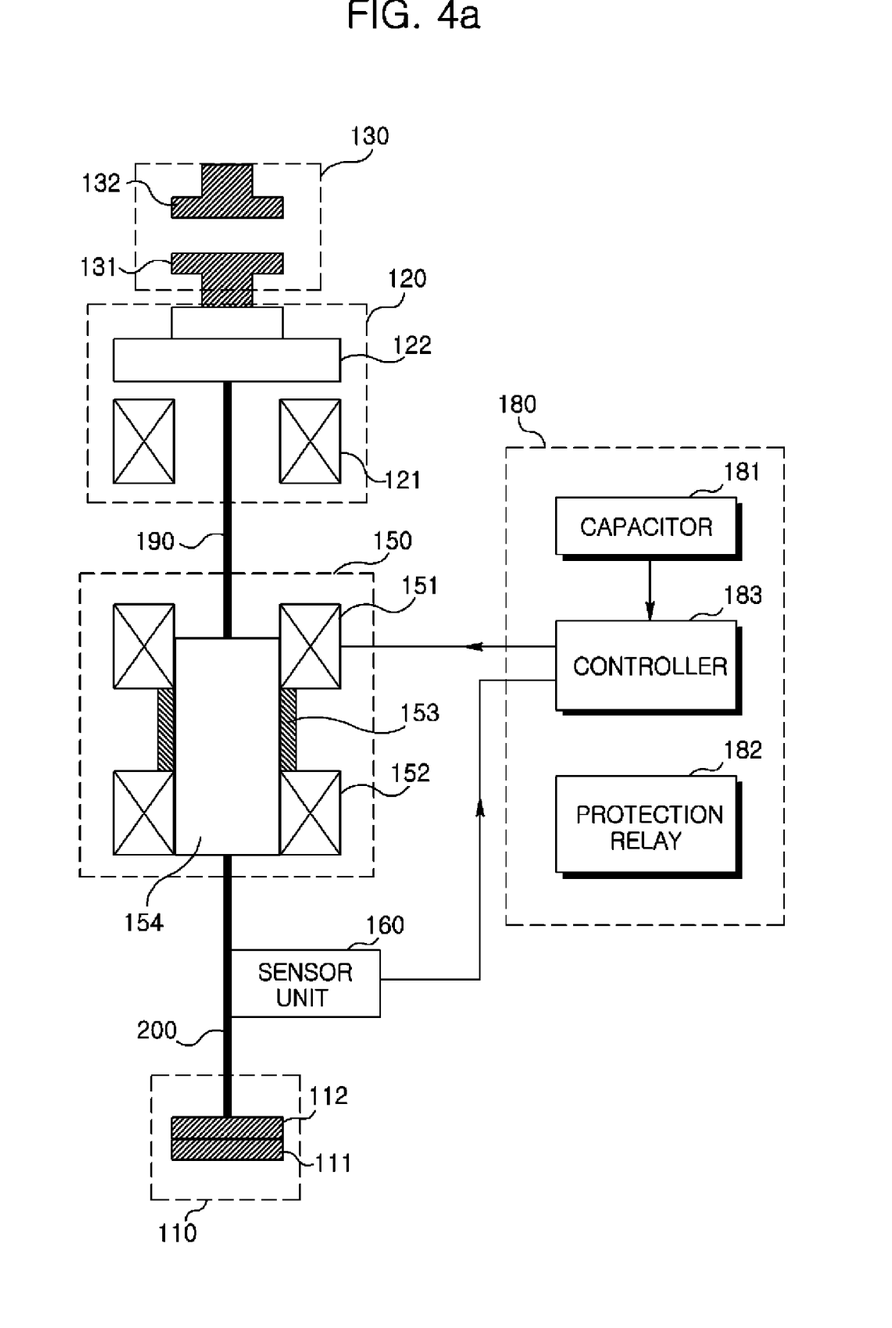
FIGS. 4a and 4b are schematic configurative diagrams illustrating an operation process of a fault current limiter according to an exemplary embodiment of the present disclosure.
Figure 4B:
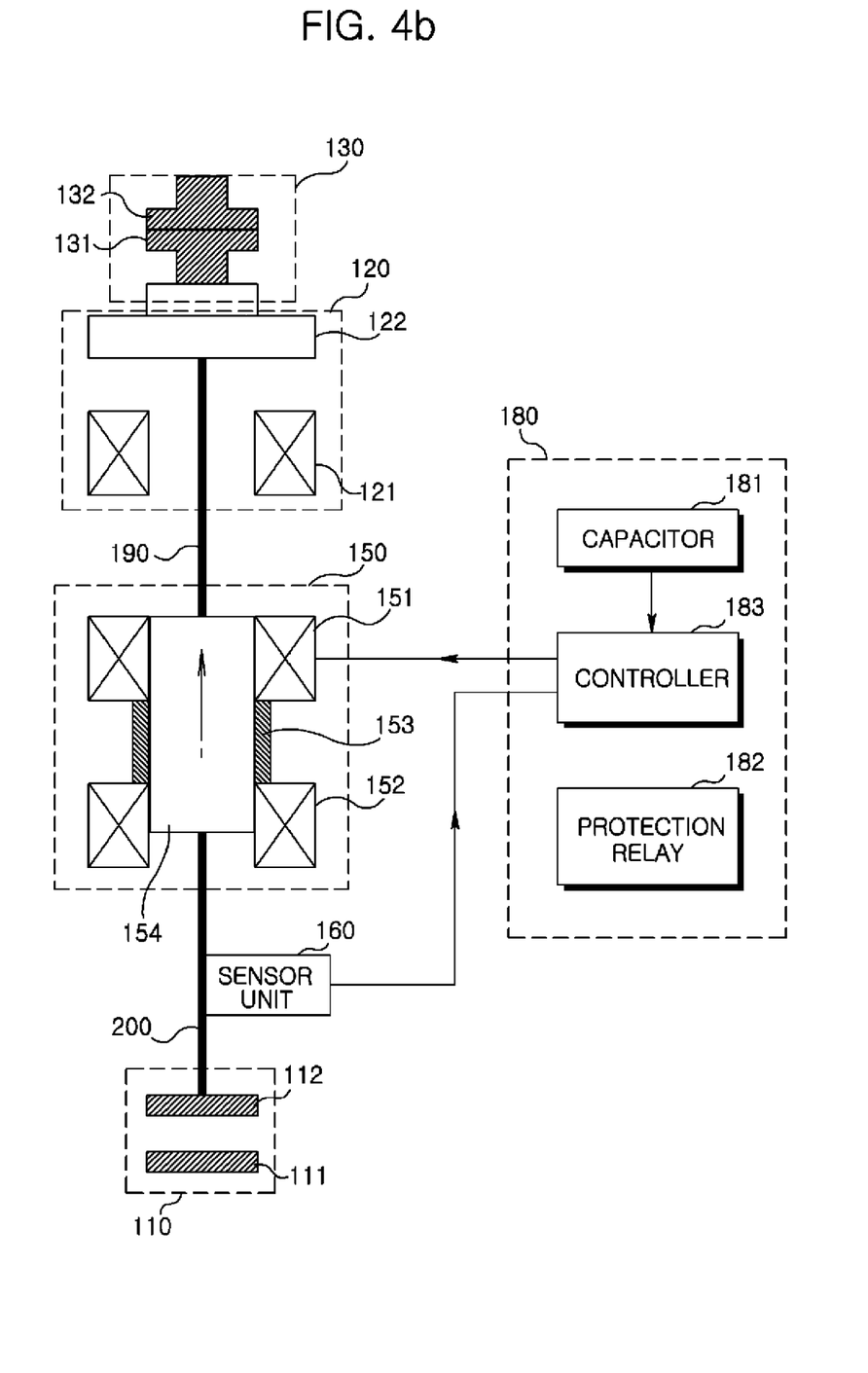

FIGS. 4a and 4b are schematic configurative diagrams illustrating an operation process of a limiter according to an exemplary embodiment of the present disclosure.

With reference to FIGS. 2, 4a and 4b, the process of limiting a fault current by the control module and the fault current limiter according to the present disclosure will be described in detail, in a case where the fault current is generated while there was a normal current.

In a case there flows a normal current, the contact points of the first switch 110 are closed, the lower end of the plunger 154 is positioned on a straight line with the lower end of the third coil, the first coil 121 of the driver 120 and the repulsive plate 120 are almost in contact each other, and the contact points of the second switch 130 are opened. However, it should be noted that the lower end of the plunger 154 and the lower end of the third coil are not always on the straight line.

Meanwhile, if a fault current is generated, the fault current is made to flow the first coil 121 of the driver 120 by the trigger device 100. The first coil 121 of the driver 120 is made to generate an electronic repulsive force by the fault current, whereby the repulsive plate 122 is moved upwards by the electronic repulsive force.

Due to the fact that the first switch 110, the plunger 154 and the second switch 130 are connected by one or more connection axles, if the repulsive plate 122 is moved upwards, the first switch 110 is made to allow the contact points to be closed, the plunger 154 is made to move upwards and the contact points of the second switch 130 are brought into contact (closed).

At this time, the sensor unit 160 determines the generation of fault current by checking whether the connection axle has moved upwards by the fault current. The sensor unit 160 may determine that the fault current has been generated even if the connection axle has moved upwards a little bit. Therefore, the sensor unit 160 may not use the generation of fault current as reference in a case the connection axle contacts the contact points of the second switch 130 or if the plunger 154 has fully moved upwards.

The sensor unit 160 transmits the determination result to the controller 183. The sensor unit 160 determines if the connection axle has moved upwards by the generation of the fault current, and transmits the determination result to the protection relay 182, where the protection relay 182 transmits the determination result to the controller 183.

In order to shorten the time, the sensor unit 160 is preferred to directly transmit to the controller 183 the determination result of whether the connection axle has moved upwards by the fault current.

Besides using, by the sensor unit 160, the position change of the connection axle, the sensor unit 160 may determine whether the fault current has been generated by using position change of the first switch 110, position change of the first coil 121 and the repulsive plate 122, position change of the second switch 130 or the position change of the plunger 154. The detailed description thereto has been already made in the above statement.

The controller 183 may control (driving power) of a current discharged from the capacitor 181 in response to the determination result inputted by the sensor unit 160. For instance, if the determination result inputted from the sensor unit 160 shows that there is generated a normal current, the controller 183 does no control at all.

However, if the determination result inputted from the sensor unit 160 shows that there is generated a fault current (e.g., in a case the connection axle has moved upwards or the like), the controller 183 controls in such a way that the current discharged from the capacitor 181 is made to flow to the second coil 151.

If the current flows in the second coil 151, the plunger 154 is moved upwards, whereby the repulsive plate 122 is moved upwards, and the contact points of the second switch 130 are brought into contact to allow the fault current to flow in the first coil 121 or the second switch 130.

The fault current flowing through the first coil 121 or the second switch 130 is limited by the resistor 140 connected to the rear end.

FIG. 4b illustrates results of position changes of constituent elements that are generated by the current flowing in the second coil 151. That is, the current flowing in the second coil 151 makes the plunger 154 move upwards, the contact points of the first switch 110 opened, the repulsive plate 122 move upwards and the contact points of the second switch 130 contact each other.

In doing so, the control is performed in the above method to allow the current system to promptly and normally operate even if the current limiter is abnormally operated to fail to limit the fault current properly.

For example, there may be cases where the repulsive plate 122 is moved upwards a little bit or returns to an original position after moving upwards due to insufficient electronic repulsive force generated by the fault current.

If the above cases occur, the fault current is not properly limited to allow the fault current to flow to the power equipment connected to the rear end, making the equipment damaged. Furthermore, if the current limiter is not properly operated, the trigger device 100, the first switch 110, the driver 120 and the second switch 130 are fatally damaged at the same time.

Therefore, the current discharged by the capacitor 181 is made to flow to the second coil 151 to allow the plunger 154 and the repulsive plate 122 to move upwards, thereby limiting the fault current in the normal way.

Figure 5A:
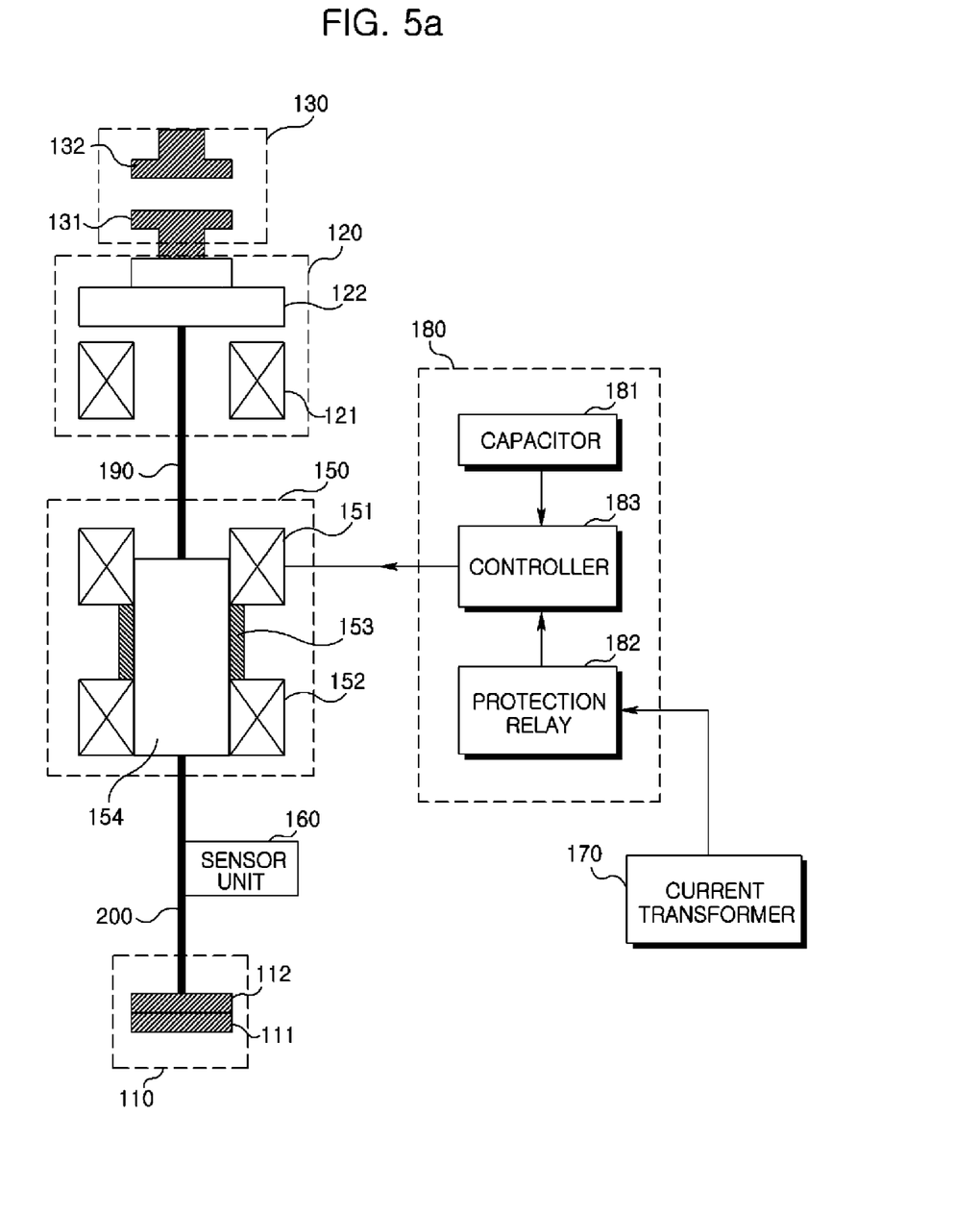
FIGS. 5a and 5b are schematic diagrams illustrating an operation process of a fault current limiter according to an exemplary embodiment of the present disclosure.
Figure 5B:
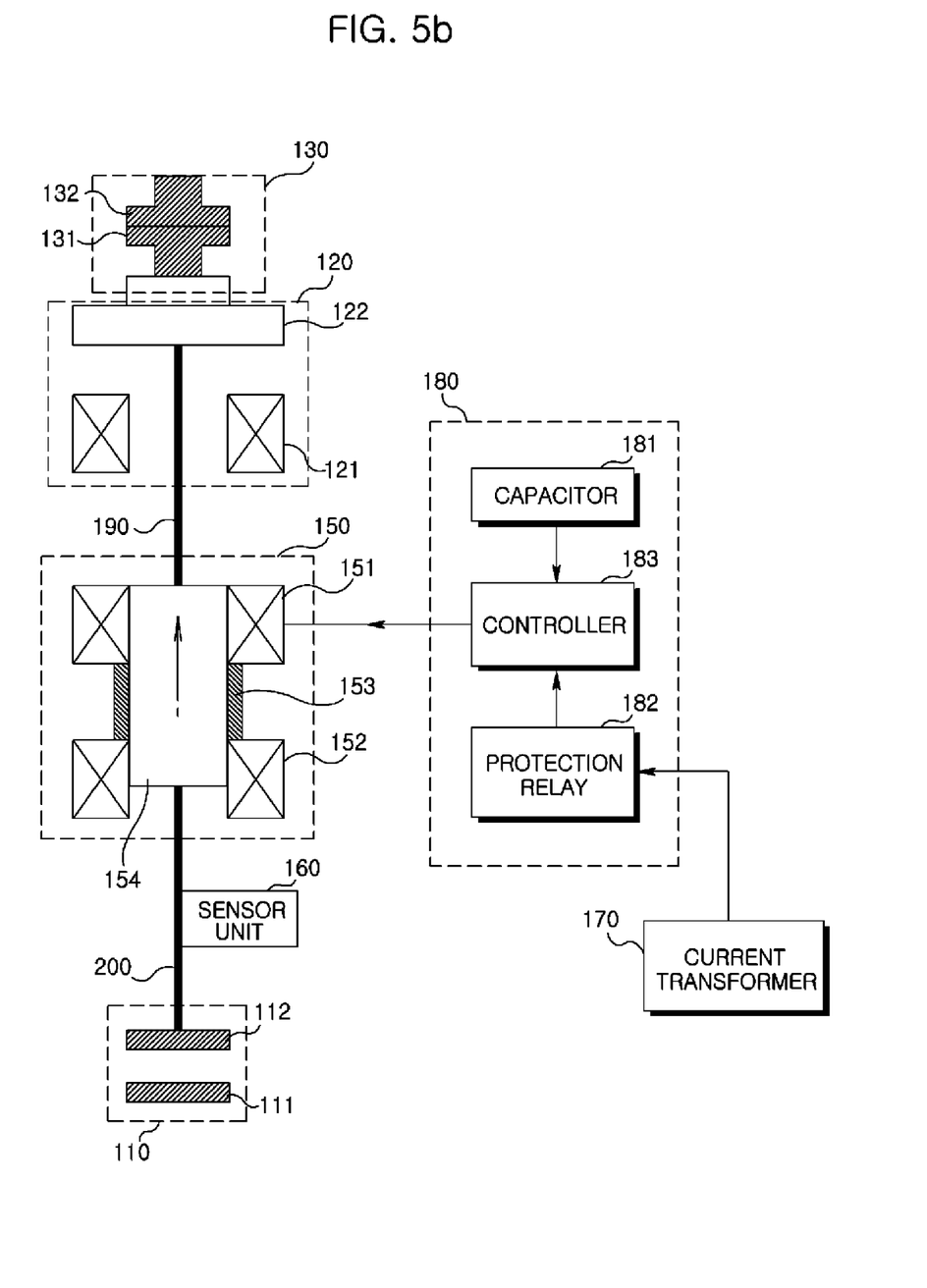

FIGS. 5a and 5b are schematic diagrams illustrating an operation process of a limiter according to an exemplary embodiment of the present disclosure.

With reference to FIGS. 2, 5a and 5b, the process of limiting a fault current by the control module and the fault current limiter according to the present disclosure will be described in detail, in a case where the fault current is generated while there was a normal current. The case where a normal current is generated and the constituent elements are the same as those in FIG. 4a, such that description thereto will be omitted herein.

The current transformer 170 may be connected in series to a rear end f the first switch 110 and the resistor 140 to reduce a large input current at a predetermined ratio and to output the reduced current. The reduced current is inputted into the control module 180. The protection relay 182 uses the reduced low current value inputted from the current transformer 170 to determine a current value flowing in the current system, compare the current value with a predetermined current value set up by the user, and determine if there is generated a fault current.

The protection relay 182 determines the current flowing in the current system as a fault current if the current flowing in the current system is larger than the predetermined current value. If it is determined as a fault current, the protection relay 182 transmits to the controller 183 information signal including information defining the fault current. The controller 183, once the information signal is inputted from the protection relay 182, controls in such a fashion that the current discharged from the capacitor 181 flows to the second coil 151.

In a case the current flows in the second coil 151, the plunger 154 is moved upwards. As a result, the repulsive plate 122 is moved upwards, the contact points of the second switch 130 are brought into contact, whereby the fault current flows through the first coil 121 or the second switch 130. The fault current flowing through the first coil 121 or the second switch 130 is limited by the resistor 140 connected to the rear end.

FIG. 5b illustrates a result of position change of constituent elements that is generated by the current flowing in the second coil 151.

That is, the flowing of current in the second coil 151 makes the plunger 154 move upwards, the contact points of the first switch 110 opened, the repulsive plate 122 move upwards and the contact points of the second switch 130 closed. In doing so, the control is performed in the above method to allow the current system to promptly and normally operate even if the current limiter is abnormally operated to fail to limit the fault current properly.

Figure 6A:
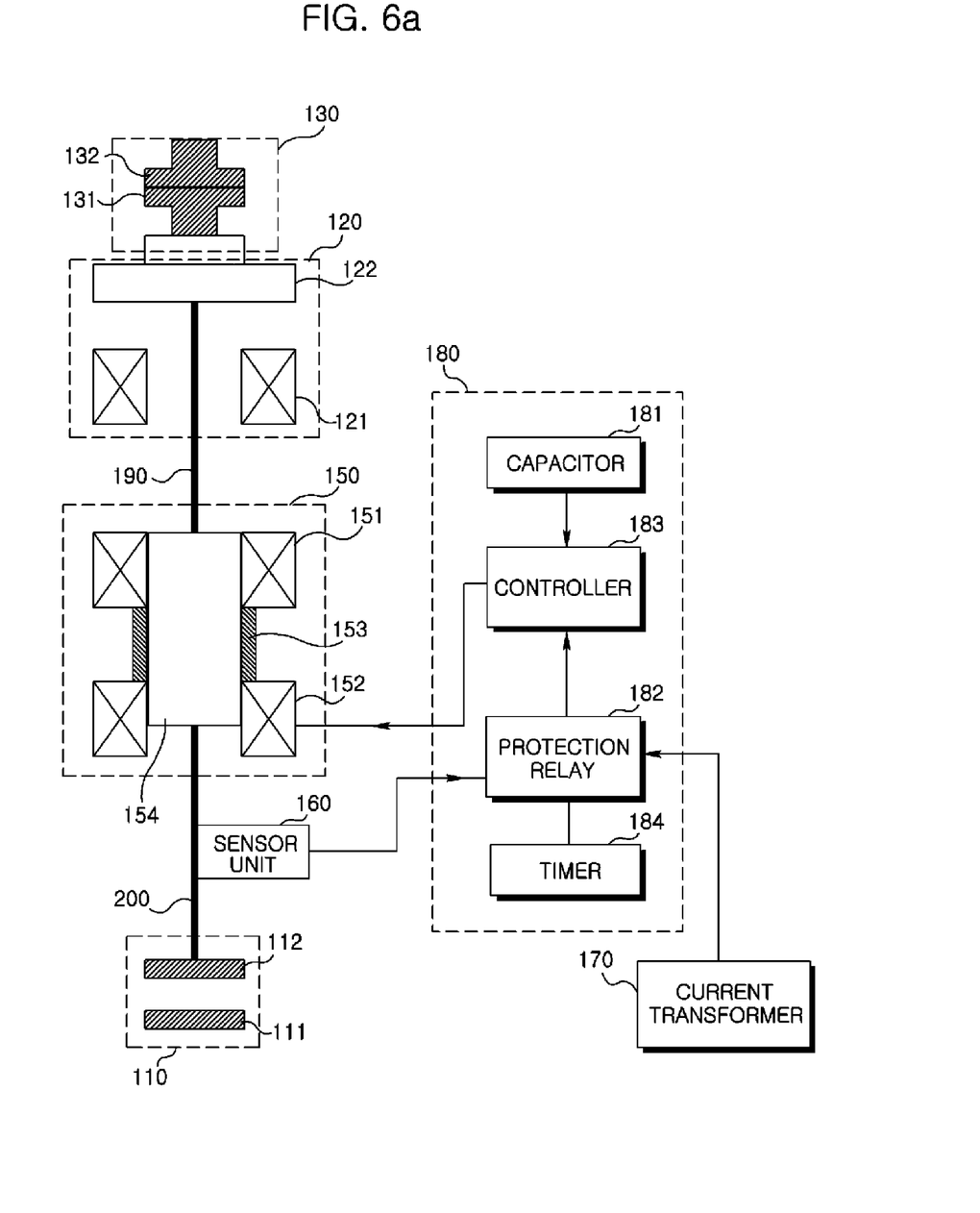
FIGS. 6a and 6b are schematic configurative diagrams illustrating an operation process of a fault current limiter according to exemplary embodiment of the present disclosure.
Figure 6B:
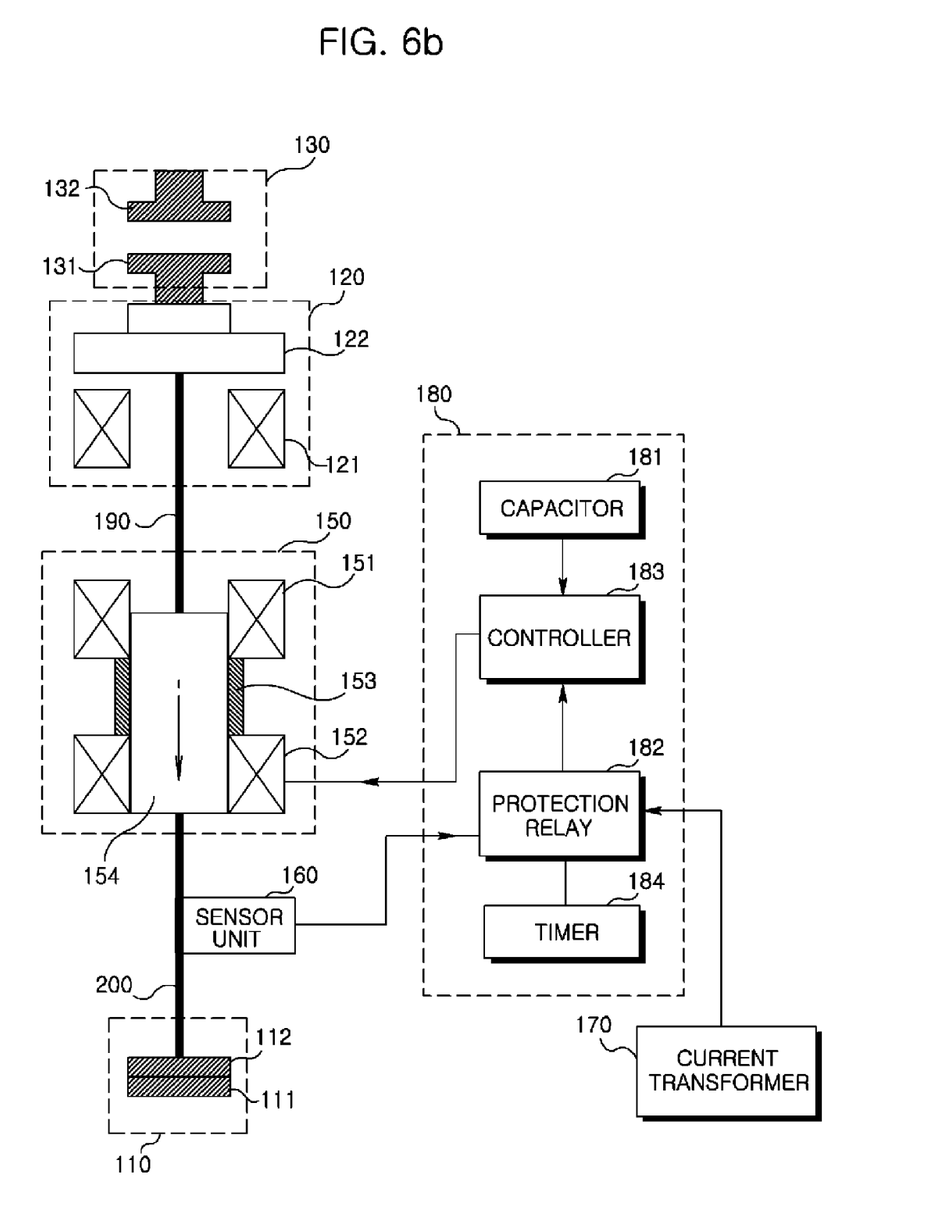

FIGS. 6a and 6b are schematic configurative diagrams illustrating an operation process of a limiter according to exemplary embodiment of the present disclosure.

With reference to FIGS. 2, 6a and 6b, the process of limiting a fault current by the control module and the fault current limiter according to the present disclosure will be described in detail, in a case where the fault current is generated and then disappears (a normal current is generated).

If a fault current flows, contact points of the first switch 110 are opened, an upper end of the plunger 154 is positioned on a straight line with the upper end of the third coil, the first coil of the driver 120 and the repulsive plate 120 are separated, and the contact points of the second switch 130 are closed. The upper end of the plunger 154 and the upper end of the third coil may not be always on the same straight line.

The current transformer 170 may be connected in series to a rear end of the first switch 110 and the resistor 140, reduce a large input current at a predetermined ratio and output the reduced current. The reduced output current is inputted to the control module 180.

The protection relay 182 uses the reduced current inputted from the current transformer 170 to determine a current value flowing in the current system, compares with a predetermined current value set up by the user and to determine whether there is generated a fault current.

The protection relay 182 determines as a normal current if the current value in the current system is smaller than the predetermined current value set up by the user. If it is determined as the normal current, the protection relay 182 transmits to the controller 183 information signal including information defining the normal current. The controller 183, if inputted with the information signal from the protection relay 182, controls in such a manner that the current discharged from the capacitor 181 flows to the third coil 152.

If the current flows in the third coil 152, the plunger 154 moves downwards. As a result, the repulsive plate 122 is moved downwards to detach the contact points of the second switch 130 and to close the contact points of the first switch 110. Therefore, the current flows through the first switch 110. The current may be a normal current.

Furthermore, in determining whether the current is a fault current or a normal current, the protection relay 182 may use both the current value inputted from the current transformer 170 and the information transmitted from the sensor unit 160 of whether the contact points of the first switch 110 are brought into contact. The determination method of the protection relay 182 has been already discussed in FIG. 3.

In a case the protection relay 182 uses the current value inputted from the current transformer 170 to determine that the current is a normal current, control is made in such a manner that determination is made again after a predetermined time (within 3 seconds) set up by the user using the timer 184 lapses.

If the protection relay 182 determines that the current is a normal current, the timer 184 controls in such a fashion that an operation determined by the protection relay 182 is stopped for a predetermined time set up by the user. The driving method by the protection relay 182 using the timer 184 has been already illustrated in FIG. 3.

As noted above, the protection relay 182 uses various methods to determine whether a normal current is generated, and transmits to the controller 183 a close operation control signal.

FIG. 6b depicts a result of position change of constituent elements that is generated by the current flowing in the third coil 152. That is, the current flowing in the third coil 152 makes the plunger 154 move downwards, makes the contact points of the first switch 110 closed, makes the repulsive plate 122 move downwards, and makes the contact points of the second switch 130 opened. As a result, in a case the fault current disappears to allow a normal current to flow, the fault current limiter according to the present disclosure can determine whether a normal current is generated without any separate manipulation, and perform an operation of closing the first switch 110.

By doing so, the fault current limiter is prevented from limiting the normal current, even in a case the fault current limiter is abnormally operated to limit the normal current.

As a result, in a case the fault current is removed, the fault current limiter is allowed to swiftly flow the normal current and the equipment connected to the power system to be normally operated. However, it should be preferably careful to determine whether the normal current is generated.

Now, in view of the time-wise order of processes in FIG. 4a to FIG. 6b, the operations in FIGS. 4a and 4b are foremost generated, the operations in FIGS. 5a and 5b are generated next and the operations in FIGS. 6a and 6b occur in the last order. The processes thus mentioned are performed in a very short period of time.

It should be apparent that the control module and the fault current limiter according to the present disclosure need not all the processes thus described, and may select a process or processes according to the need.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. A fault current limiter including a control module with function of opening and closing, comprising: a trigger device dividing a fault current to a path on which a normal current flows and to a path on which the fault current flows when the fault current is generated; a first switch connected in series to a rear end of the trigger device; a fixation unit for fixing an open/close state of the first switch; a driver for opening a contact point contacted by the first switch by repulsive force generated by the fault current in a case the fault current divided by the trigger device is inputted; and a control module for driving the fixation unit in order to fix the open/close state of the first switch in a case the fault current is generated.

2. The fault current limiter of claim 1, wherein the control module supplied a driving power to the fixation unit for closing the contact points of the first switch in a case the fault current disappears, and driving the fixation unit for fixing the closeness of the first switch.

3. The fault current limiter of claim 1, wherein the driver comprises: a first coil generating a repulsive force in a case the fault current is generated; and a repulsive plate that is changed in position thereof by the repulsive force.

4. The fault current limiter of claim 3, wherein the fixation unit comprises: a second coil disposed at an upper side of the fixation unit for performing an operation of opening the contact points of the first switch when a current flows; a third coil disposed at a lower side of the fixation unit for performing an operation of closing the contact points of the first switch; and a plunger disposed inside the second coil and the third coil for vertically moving in response to the operations of closing and opening the contact points.

5. The fault current limiter of claim 3, further comprising a second switch directly coupled with the repulsive plate or connected to a connection axle, and contacted at the contact points thereof if the repulsive plate is moved upwards by the repulsive force generated by the fault current.

6. The fault current limiter of claim 4, further comprising: a first connection axle connected at one end thereof to the repulsive plate of the drive with the other end being connected to an upper side of the plunger of the driver for vertical movement; and a second connection axle connected at one end thereof with a lower side of the plunger with the other end being connected to the first switch for vertical movement.

7. The fault current limiter of claim 4, wherein the control module comprises: a capacitor for charging or discharging a current capable of driving the driver; a protection relay for determining whether a fault current has occurred and for outputting information signal including information of a result that has determined the fault current or a normal current according to whether the fault current has occurred; and a controller for allowing a current discharged from the capacitor to flow to the second coil if the content of the information signal inputted from the protection relay is determined as the fault current, and for allowing the current discharged from the capacitor to flow to the third coil if the content of the information signal inputted from the protection relay is determined as the normal current.

8. The fault current limiter of claim 7, further comprising a sensor unit for determining whether there is generated a fault current and transmitting a determination result to the controller or the protection relay.

9. The fault current limiter of claim 8, further comprising: a first connection axle connected at one end thereof to the repulsive plate of the drive with the other end being connected to an upper side of the plunger of the driver for vertical movement; and a second connection axle connected at one end thereof with a lower side of the plunger with the other end being connected to the first switch for vertical movement, wherein the sensor unit determines whether there is generated a fault current by using movement of the connection axles.

10. The fault current limiter of claim 8, wherein the sensor unit uses positions of contact points of the first switch, positions of first coil and repulsive plate of the driver, and position of the plunger of permanent magnet actuator to determine whether the fault current is generated.

11. The fault current limiter of claim 8, wherein the protection relay transmits to the controller the information signal including information that means a normal current only if it is determined that there is generated a normal current using the current value measured by the current transformer and a signal is inputted from the sensor unit that a fault current is generated.

12. The fault current limiter of claim 7, further comprising a current transformer connected in series to a rear end of the first switch and the driver for reducing an inputted large current at a predetermined ratio and for inputting the reduced current to the control module, wherein the control module measures the reduced low current value inputted from the current transformer and determines a current value flowing in a current system using the current value.

13. The fault current limiter of claim 7, further comprising a timer for allowing the protection relay to determine again whether the normal current is generated after lapse of a predetermined time period if the protection relay has determined that there has been generated the normal current.

14. The fault current limiter of claim 1, further comprising a second switch connected in parallel to the driver and contacted at contact points thereof simultaneously or after the contact points of the first switch are opened to conduct the fault current.

15. The fault current limiter of claim 14, further comprising a resistor connected in series to a rear end of the driver and the second switch for limiting a fault current inputted from the driver.

16. A control module disposed with an open/close function for controlling a device capable of performing an opened/closed path operation of a switch, the control module comprising: a capacitor for charging or discharging a current capable of driving the device; a protection relay for outputting information signal for determining whether the fault current has been generated and including information of a result of determining whether the current is a fault current or a normal current; and a controller for changing a path of the current discharged by the capacitor in response to the information signal in a case the information signal is inputted from the protective relay.

17. The control module of claim 16, further comprising a sensor unit for determining whether there is generated a fault current and transmitting a determination result to the controller or the protection relay.

18. The control module of claim 16, further comprising a current transformer connected in series to a rear end of the first switch and the driver for reducing an inputted large current at a predetermined ratio and for inputting the reduced current to the control module, wherein the control module measures the reduced low current value inputted from the current transformer and determines a current value flowing in a current system using the current value.

19. The control module of claim 16, further comprising a timer for allowing the protection relay to determine again whether the fault current has disappeared after lapse of a predetermined time period if the protection relay has determined that there has disappeared the fault current.

20. The control module of claim 16, further comprising a fixation unit for performing an operation of opening and closing a switch according to a path of a current discharged from the capacitor.

* * * * *